April 29, 1941.    J. B. BORGADT    2,240,170

METHOD OF PRODUCING WELDED TUBING

Filed Sept. 2, 1939

INVENTOR.
JOHN B. BORGADT
BY
John H. Leonard
ATTORNEY.

Patented Apr. 29, 1941

2,240,170

UNITED STATES PATENT OFFICE 2,240,170

METHOD OF PRODUCING WELDED TUBING

John B. Borgadt, East Cleveland, Ohio

Application September 2, 1939, Serial No. 293,266

4 Claims. (Cl. 219—10)

This invention relates to a method for producing welded tubing from strip or sheet skelp, and particularly to the method of preparing the skelp or stock material for welding by a resistance welding mechanism.

Heretofore, in the manufacture of welded tubing by means of resistance electrodes, wherein the stock is advanced continuously or intermittently along a given path and welded at one portion of the path, the practice has been to sand blast or pickle the skelp before the introduction thereof into the forming and welding mechanism, so as to provide on the material a better surface for engagement by the welding electrodes. However, the surfaces produced in this manner, though better than untreated surfaces, are somewhat irregular and rough, and often coated with oxide and scale. This condition results in inefficient contact between the electrodes and the stock. This inefficient contact not only causes burning and irregular heating of the stock material being welded but also causes arcing and burning, which is damaging both to the electrodes and the stock.

The present invention has to do with the elimination of the difficulties resulting from this imperfect and inefficient commutation between the electrodes and stock, and contemplates the provision of a smooth, accurately finished, bright, surface on that portion of the stock to be engaged by the electrodes.

Another object of the invention resides in the manner of producing this surface on the stock so it may be formed and welded into tubing efficiently and with very slight changes in the commonly used forming and resistance welding equipment.

Another object of my invention resides in the formation of the stock strip in a manner such that excess material is provided along certain areas which are to be engaged by the electrodes, so that a substantial amount of this excess material may be removed for forming an accurate, bright, smooth contacting surface which is highly finished without reducing the thickness of any part of the stock below its standard gauge.

Other objects and advantages will become apparent from the following specification, wherein reference is made to the drawing, in which Fig. 1 is a somewhat diagrammatic elevation of a forming and a resistance welding mechanism, provided with means for surfacing the tubing to be welded;

Figure 1:
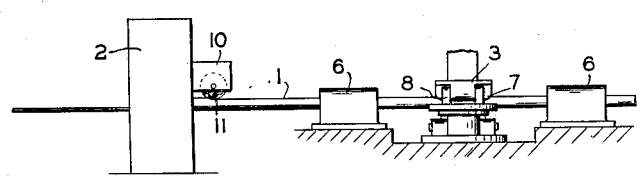

My invention is particularly adapted for use in connection with the formation of welded tubing from flat strip stock by an apparatus such as diagrammatically illustrated in Fig. 1. The strip skelp 1 is fed intermittently through suitable forming rolls of the usual type, indicated at 2, by which it is given a tubular form with an open seam cleft. The partially formed tubing passes from the forming rolls 2 into a welding mechanism indicated at 3, the tubing being maintained in properly aligned position within the welding machine.

The welding mechanism may be of any of the usual continuous types commonly used in resistance welding, but I prefer to use a machine such as described and claimed in my copending application Serial No. 293,265, filed September 2, 1939.

Figure 7:
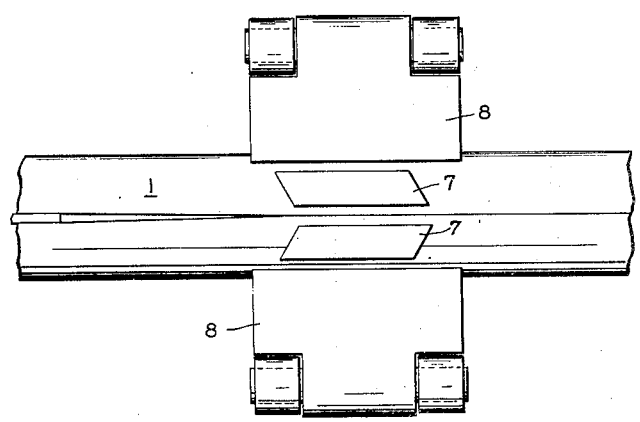
Fig. 7 is a diagrammatic plan view illustrating the relative position of the resistance electrodes and machined surface of the formed stock.

Briefly, such mechanism comprises a support in which are mounted reciprocating feeders 6 and companion electrodes 7 which are adapted to be placed in contact relation with the stock concurrently for heating the stock for the purposes of welding. In such welding mechanism, one electrode engages the stock on one side of the open seam cleft, the other engaging the stock on the opposite side of the cleft, as better illustrated in Fig. 7.

Each electrode is so positioned relative to the tubing preparatory to engagement therewith that it engages the tubing substantially over the entire electrode length and width simultaneously. The electrodes 7 are provided with contact faces which are movable with relation to the body of the electrode with which associated so as to move inwardly with the tubing as the seam cleft is closed by the closure means 8 and thereby maintain full contact therewith during such movement for insuring effective commutation. In order to obtain the full benefits of this contracting of the electrode faces, however, it is necessary to make the contact surfaces of the tube substantially the same in contour as the contact faces of the electrodes and at the same time to make such surfaces not only smooth and bright but also very accurately machined, because the more nearly perfect is the surface, the more efficient is the passage of the current thereto by the electrodes.

Figure 2:
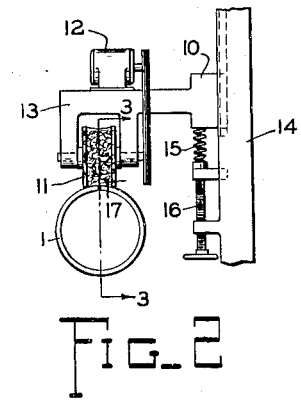
Fig. 2 is an enlarged elevation of a form of surfacing mechanism which may be used in connection with the apparatus illustrated in Fig. 1.

A planing or grinding mechanism 10 is positioned intermediate the forming rollers 2 and the welding mechanism 3. This mechanism, which is better illustrated in Fig. 2, may comprise a grinding wheel 11 driven by any suitable means, such as a motor 12, the wheel being mounted in a yoke frame 13 slidable in a vertical frame 14 for purposes of adjustment. If desired, the grinding wheel may be supported resiliently in its vertical position by means of a spring 15, the tension or compression of which spring is regulated by a suitable jack screw 16 carried on the upright frame 14.

The grinding surface 17 of the grinding wheel is shaped so as to grind the surface of the tube 1 to a contour which will coincide accurately with the contacting faces of the electrodes 7 when the electrodes engage the tube, allowance being made for the partial closure or additional closure of the seam cleft during travel of the tube through the welding mechanism. With such an arrangement, it is possible to machine on the tube surface at each side of the seam cleft a continuous marginal path with a smooth, bright and very accurate finish, so that the most nearly perfect conformance and contact between the electrode faces and the tube is obtained. Instead of the grinding wheel 11, however, a milling cutter may be used so as to obtain greater accuracy and smoothness. In some cases, likewise, it is possible to use for this machining operation, a broach, such as described in my copending application Serial No. 44,224, filed October 9, 1935 (now Patent No. 2,187,485, issued January 16, 1940), or other suitable devices which will provide an accurate cut and a very smooth finished surface.

Figure 3:
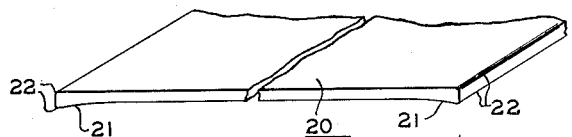
Fig. 3 is a partial cross sectional view of the surfacing mechanism and is taken on the plane indicated by the line 3—3 of Fig. 2.
Figure 4:
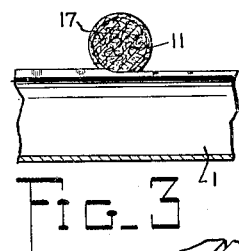
Fig. 4 is a perspective view of a length of stock material formed for carrying out the method of the present invention in the most effective manner.
Figure 5:
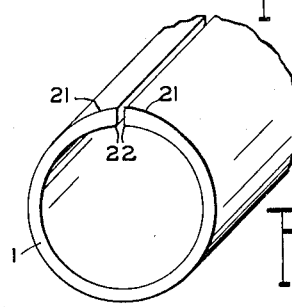
Fig. 5 is a perspective view of a length of partially formed tubing resulting from operation on the stock illustrated in Fig. 4.
Figure 6:
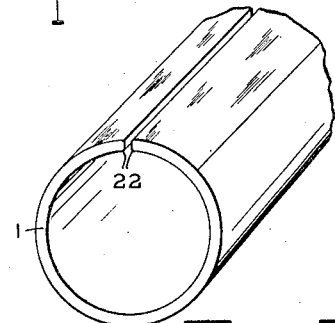
Fig. 6 is a perspective view of a length of tubing after the machining operation.

While the method herein described may be practiced with the usual flat skelp, I prefer to furnish additional material along the strip margins which, for the purposes to be described, are to be contacted by the electrodes 7 for resistance welding. A strip prepared for this purpose is illustrated in Fig. 4 and designated as 20. Longitudinally of the strip and along the marginal areas thereof the strip is thickened, as indicated at 21, this thickening or bead being provided during the rolling operation. For practical rolling, it is preferred that the extra marginal thickness, indicated at 21, be gradually decrescent inwardly, but it must extend a distance slightly greater than the width of the contact faces of the electrodes 7. At the same time, the edges are rounded as indicated at 22 for the purposes described. Strips so formed, when passed through the apparatus above described, are bent into tubular form in a manner which disposes outwardly the thickened beads 21, so that when the edges of the strip are brought into juxtaposition to form the seam cleft, the marginal areas of the tube adjacent to the cleft and in the path of the electrodes are considerably thickened. As the tube passes the cutting or machining mechanism, the cutter 11 removes a substantial portion of this thickened material, as indicated in Fig. 3, bringing this portion of the stock to substantially the same thickness as the remainder thereof. The additional thickness 21 is ample so that upon removing the surface material to bring the stock thickness along this path to the same thickness as the tubing, any depressions or irregularities in the surface of the tube are completely removed and a polished smooth and very accurate contact surface extending longitudinally of the tube along the seam cleft and into the path of the electrodes is provided. As above described, this surface is substantially the same contour as the contacting faces of the electrodes.

Referring again to Fig. 1, the tube, of course, enters the apparatus at the left, being formed in the forming rolls 2 and while retained in proper aligned position for welding, is engaged by the cutting mechanism 11 before passing into the welding mechanism 3. If desired, any means may be used to brush off any grit or chips of metal or other dust that would tend to mar the machined surface in any way, and since the tubular skelp passes immediately into the welding apparatus, the highly polished and accurately formed surface is immediately engaged by the electrodes so that a most effective contact is provided.

While I have described my invention as applied for producing welded tubing from steel skelp, it is apparent that it may be used for any other metals, and by the use of the term "skelp" herein, I mean to include sheet strip or metal stock whether of steel or of other metals.

The invention is meant to apply also to resistance welding wherein the stock is fed continuously, instead of intermittently, through a welding mechanism, such as the mechanism described in U. S. Letters Patent No. 2,048,682, issued to me on July 28, 1936.

I claim:

1. A method of producing welded tubing from stock by resistance electrode mechanism which comprises forming the strip with wide marginal beads extending longitudinally thereof, passing the stock through forming rolls for forming the stock into substantially tubular form and with said beads disposed on the outer surface, one at each side of said seam cleft, machining the surface material from the beads after the stock passes from the forming rolls and while the stock is held in tubular form and thereby forming the surface of said beads substantially congruent to the contact surface of the electrodes to be engaged thereby, and thereafter causing the electrodes to engage said machined surfaces for effecting heating of the stock.

2. A method of producing resistance welded tubing which consists in forming skelp stock with longitudinal beads along the margins on one face of the skelp, forming the skelp into substantially tubular shape with an open longitudinally extending seam cleft and with said beads disposed outwardly, removing part of the outwardly disposed surfaces of the beads along and at each side of the seam cleft, while the skelp is held in said substantially tubular shape, to form thereon continuous, accurate, smooth surfaces positioned for engagement with resistance electrodes of a resistance welding mechanism as the tube is passed therethrough, and then passing the stock through said welding mechanism.

3. The method of resistance welding of metal stock with a welding mechanism employing resistance electrodes, comprising forming thickened longitudinally extending marginal beads on the stock surface, said beads being relatively wide and extending inwardly from the edges to be welded a distance at least as great as necessary to provide substantial marginal contact area for cooperation with welding electrodes to be applied thereto, removing surface material of the beads to form continuous, accurate, uniform, smooth surfaces having a contour substantially congruent transversely to the contact surfaces of electrodes of the resistance welding mechanism to be engaged therewith, passing the stock through said welding mechanism with said surfaces in contacting relation to said electrodes.

4. The method of preparing stock for producing welded tubing by resistance electrode mechanism, which comprises forming the stock with longitudinally extending marginal beads at the respective edges to be welded, which beads are greater in thickness than the normal skelp thickness by an amount at least substantially equal to the depth of normal surface irregularities accruing during heating and rolling operations, and said beads being of a width approximating the width of the contact surfaces of the welding electrodes of the mechanism, thereafter forming the stock into tubular form with an open seam cleft with the beads disposed outwardly, and, while the stock is in tubular form, removing a portion of the metal from the surface of the outwardly disposed beads to a depth sufficient to form continuous, smooth, accurate, uniform contact surfaces of a contour substantially congruent transversely to the contact surfaces of the welding electrodes to be engaged therewith for welding the stock and in position to be engaged thereby as the stock is passed through said mechanism, then passing the formed stock through the resistance electrode mechanism and applying the electrodes to said uniform contact surfaces of the formed stock.

JOHN B. BORGADT.